Figure 1:
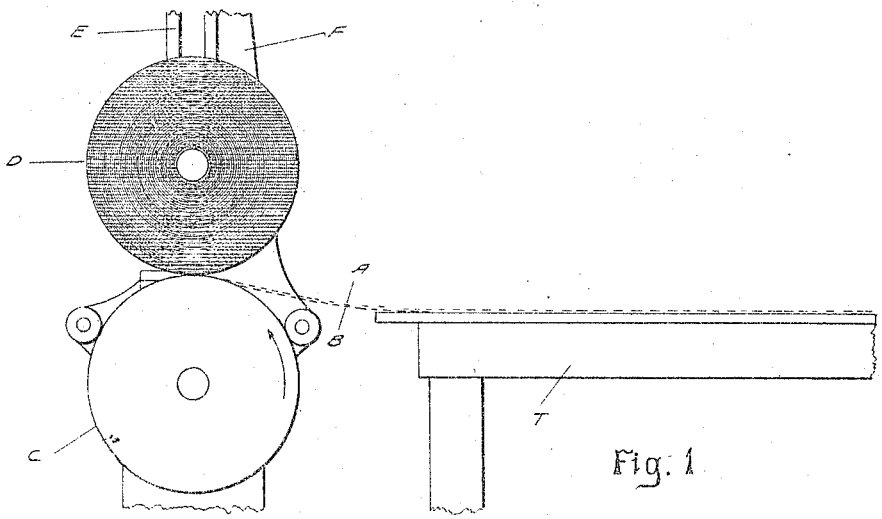

W. C. STEVENS.
BIAS FABRIC PACKAGE.
APPLICATION FILED JUNE 18, 1915.

1,181,937.

Patented May 2, 1916.

Witness:
John W. Kittredge

Inventor
William C. Stevens.
Attorney

UNITED STATES PATENT OFFICE.

WILLIAM C. STEVENS, OF AKRON, OHIO, ASSIGNOR TO THE FIRESTONE TIRE & RUBBER COMPANY, OF AKRON, OHIO, A CORPORATION OF OHIO.

BIAS-FABRIC PACKAGE.

1,181,937.      Specification of Letters Patent.      Patented May 2, 1916.

Application filed June 18, 1915. Serial No. 34,803.

*To all whom it may concern:*

Be it known that I, WILLIAM C. STEVENS, a citizen of the United States, residing at Akron, in the county of Summit and State of Ohio, have invented certain new and useful Improvements in Bias-Fabric Packages, of which the following is a specification.

In the process of making tire carcasses from frictioned fabric, *i. e.* fabric coated on one surface with a layer of gum, it has been the custom hitherto to cut the fabric in strips at an angle of 45° or as commonly known, on the bias. In the operation of the ordinary bias cutter, the strips after having been cut from the leading end of the frictioned fabric, have been allowed to fall on a series of longitudinal belts, which have carried them to the rear of the cutting machine, where they have been placed in so-called "books." A book consists of a board, on the surface of which, is placed a series of strips of muslin or other fabric, secured to the board by a narrow nailing strip along one longitudinal edge. Two operators have been required to place these strips of fabric in the books, it being required that they pick the strips off the belts and turn over a protecting leaf, before placing another strip in the book. This is an expensive operation, and the books themselves are unsatisfactory, as they occupy a great deal of floor space, and are very cumbersome.

In the drawings is shown the new form of package or roll of bias strips in the process of manufacture, the apparatus for forming the rolls in combination with the bias cutter, forming the subject matter of a separate application, Serial No. 34,802, filed herewith.

Figure 2:
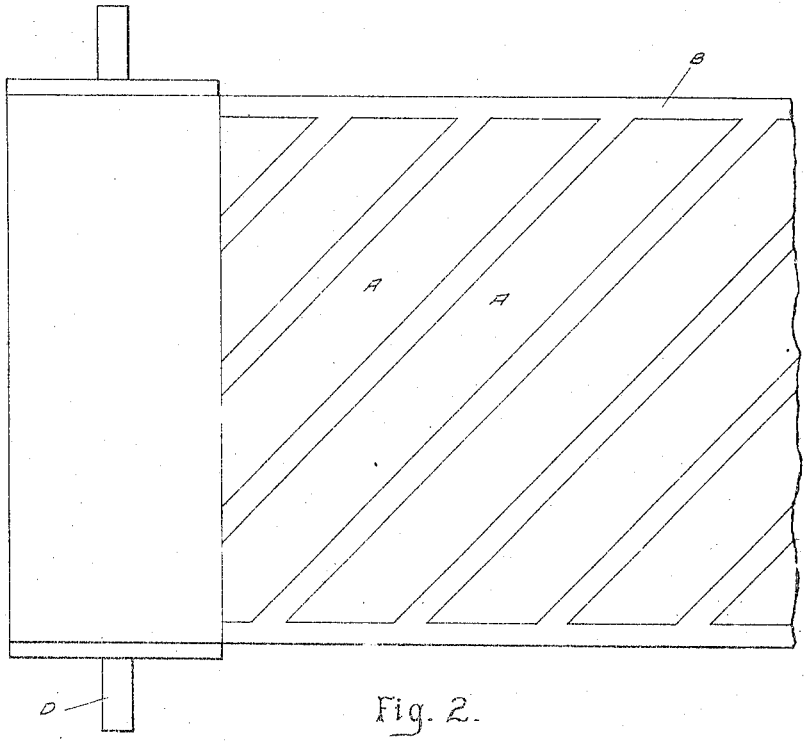

Figure 1 is an elevation of a package in the process of manufacture. Fig. 2 is a plan of Fig. 1.

The cutter and mechanism for rolling up the bias strips with the liner are not shown, as they are not necessary for an understanding of this invention, it being sufficient to state that the bias strips as they are cut from the leading end of the frictioned fabric, fall on an intermittently moving strip of muslin or other liner.

The bias strips are indicated at A and are spaced a short distance apart on the muslin liner B, moving over a table T. The leading end of the liner is attached to a core D, which is guided in slots E in the machine standard F, and is allowed to rest on a wind-up drum C, which is rotated in any manner, preferably intermittently. As the drum is rotated in the direction of the arrow, the liner and the strips are wound up in the form of a roll, and when one length of liner has been rolled up, the core may be removed with the material wound thereon, and a new one substituted.

It will be seen that there is provided a package containing the strips of rubber coated or frictioned cloth cut on the bias, and separated from one another to prevent adhesion, by a continuous length of liner fabric. The bias strips in this form are much easier to handle, and more convenient and compact, than the old books, which up to this time have been the only means for handling these strips. As is well known, the characteristic tackiness of the strips, makes them very troublesome to handle, as they will adhere to one another on the slightest provocation, and their separation injures the rubber coating at the point of adhesion.

Claim:

As a new article of manufacture, a core, a spiral winding of lining fabric held on said core, and a series of elongated strips of rubber-coated bias fabric laid diagonally to the length of said lining fabric and placed with their long edges in proximity, said strips being held between and prevented from contact with each other by the convolutions of said lining fabric.

WILLIAM C. STEVENS.

Witness:
J. J. SHEA.